US011608430B2

(12) United States Patent
Mikolajczak et al.

(10) Patent No.: US 11,608,430 B2
(45) Date of Patent: Mar. 21, 2023

(54) ELECTRICALLY CONDUCTIVE TREAD CHIMNEY COMPOUND

(71) Applicant: COOPER TIRE & RUBBER COMPANY, Findlay, OH (US)

(72) Inventors: Jacob A. Mikolajczak, Toledo, OH (US); Matthew S. Snider, Findlay, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 170 days.

(21) Appl. No.: 16/868,619

(22) Filed: May 7, 2020

(65) Prior Publication Data
US 2020/0354547 A1 Nov. 12, 2020

Related U.S. Application Data

(60) Provisional application No. 62/844,168, filed on May 7, 2019.

(51) Int. Cl.
| C08L 7/00 | (2006.01) |
| C08L 9/02 | (2006.01) |
| C08L 91/00 | (2006.01) |
| B60C 1/00 | (2006.01) |
| C08K 3/04 | (2006.01) |

(52) U.S. Cl.
CPC .............. *C08L 7/00* (2013.01); *B60C 1/0016* (2013.01); *C08K 3/04* (2013.01); *C08L 9/02* (2013.01); *C08L 91/00* (2013.01)

(58) Field of Classification Search
CPC ... C08L 7/00; C08L 9/02; C08L 91/00; C08K 3/04; B60C 1/00
USPC ........................................................ 523/156
See application file for complete search history.

(56) References Cited

U.S. PATENT DOCUMENTS

| 5,489,627 | A | 2/1996 | Sandstrom |
| 6,218,473 | B1 * | 4/2001 | Sandstrom ............... C08L 21/00 525/212 |
| 6,397,913 | B1 | 6/2002 | Kanenari et al. |
| 8,397,776 | B2 | 3/2013 | Frank et al. |
| 9,809,058 | B2 | 11/2017 | Meza et al. |
| 2003/0062106 | A1 | 4/2003 | Kanenari et al. |
| 2005/0103412 | A1 | 5/2005 | Zanzig et al. |
| 2008/0226918 | A1 | 9/2008 | Lee et al. |
| 2009/0005500 | A1 | 1/2009 | Serra et al. |
| 2010/0197829 | A1 | 8/2010 | Obrecht |
| 2012/0251751 | A1 * | 10/2012 | Blume ................. C08K 5/5455 524/188 |
| 2014/0135424 | A1 * | 5/2014 | Sandstrom ............... C08K 3/36 523/156 |
| 2016/0075901 | A1 * | 3/2016 | Beyer ................. C09D 107/00 524/575.5 |
| 2016/0221395 | A1 | 8/2016 | Meza et al. |
| 2016/0272793 | A1 * | 9/2016 | Bedard .................... C08K 7/24 |
| 2018/0105681 | A1 | 4/2018 | Pille-Wolf et al. |
| 2018/0170123 | A1 | 6/2018 | Nesbitt et al. |
| 2018/0171115 | A1 | 6/2018 | Sagitani |

FOREIGN PATENT DOCUMENTS

| EP | 0251791 B1 | 1/1992 |
| EP | 0779330 A1 | 6/1997 |
| EP | 1075966 A1 | 2/2001 |
| EP | 2520420 B1 | 2/2016 |
| KR | 100837864 B1 | 6/2008 |

* cited by examiner

*Primary Examiner* — Deve V Hall
(74) *Attorney, Agent, or Firm* — Mandy B. Willis

(57) ABSTRACT

A rubber composition for a tire tread chimney component includes a sulfur-vulcanizable elastomer and an electrically conductive polymer. The rubber composition is further defined by an absence of electrically conductive carbon black. The sulfur-vulcanizable elastomer is selected from the group consisting of natural rubber, polybutadiene, polyisoprene, styrene butadiene rubber, nitrile rubber, and combinations thereof. The sulfur-vulcanizable elastomer and the electrically conductive polymer are substantially evenly mixed together. In the tire, and upon curing, the tire tread chimney component provides a dissipative pathway for static electricity from the tire to the ground in operation.

15 Claims, 2 Drawing Sheets

ELECTRICALLY CONDUCTIVE TREAD CHIMNEY COMPOUND

CROSS REFERENCE TO RELATED APPLICATIONS

This application claims the benefit of U.S. Provisional Application Ser. No. 62/844,168, filed on May 7, 2019. The entire disclosure of the above application is hereby incorporated herein by reference.

FIELD

The present disclosure relates to rubber compositions for tires and, more particularly, electrically conductive rubber compositions for use as tread chimney components in tires.

BACKGROUND

The modern tire industry is extremely competitive. Typically, performance factors such as fuel economy, wet and dry traction, and treadwear are carefully considered by consumers when selecting their tires. The enhancement of these performance factors has increasingly become a source of much engineering effort and technical investigation in the industry.

In order to enhance fuel economy for an associated vehicle, tire treads are usually formulated or compounded to promote less rolling resistance for the tire itself.

To lessen rolling resistance, the materials of the tread rubber formulation must be selected to minimize the hysteresis properties of the resulting tire tread. One known compounding strategy for adjusting hysteresis properties of the tread rubber is to replace a significant amount of the reinforcing carbon black filler with a precipitated silica filler, which is typically covalently bonded to the rubber through a sulfur-containing silane additive.

Unfortunately, a significant reduction in rubber reinforcing carbon black usually results in undesirable electrical conductivity, particularly as the rubber reinforcing carbon black content falls below what is known as its percolation point in the rubber. This difference in electrical conductivity and grounding can likewise result in an undesirable buildup of static electricity on the tire In order to provide sufficient electrical grounding, it is also known to insert a tread "chimney" into the tire tread. The chimney is typically provided in the form of a radially extending rubber element, which extends from a tread base rubber layer, through an overlaying tread cap rubber layer, and is exposed at the outer surface of the tread. The chimney is formulated to have a higher electrical conductivity relative to the surrounding tread and other rubber tire components, and to be ground contacting in operation, so as to provide a dissipative pathway for static electricity from the tire.

The compounding of conventional tread chimney elements has involved the use of specialized, high-conductivity carbon blacks. However, these types of carbon blacks are relatively expensive, especially compared to reinforcing carbon blacks that are otherwise common in the tire industry. High-conductivity carbon blacks are also undesirable for manufacturing and handling reasons, as they require the manufacturing facility to procure and store individuals bags of the specialized carbon black. Such bags are also cumbersome to add to conventional rubber or BANBURY® mixers. Furthermore, known high-conductivity carbon blacks are difficult to disperse within most rubber compounds, and their use can result in considerable mixing variation between batches.

There is a continuing need for a rubber composition for a tread chimney that has an electrical conductivity sufficient to provide a dissipative pathway for static electricity and grounding. Desirably, the rubber composition may be formulated without the use of high-conductivity carbon black.

SUMMARY

In concordance with the instant disclosure, a rubber composition for a tread chimney that has an electrical conductivity sufficient to provide a dissipative pathway for static electricity and grounding, and which is formulated without the use of high-conductivity carbon black, has been surprisingly discovered.

In one embodiment, a rubber composition for a tire tread chimney component includes a sulfur-vulcanizable elastomer and an electrically conductive polymer. The rubber composition is further defined by an absence of electrically conductive carbon black. The sulfur-vulcanizable elastomer is selected from the group consisting of natural rubber, polybutadiene, polyisoprene, styrene butadiene rubber, nitrile rubber, and combinations thereof. The sulfur-vulcanizable elastomer and the electrically conductive polymer are substantially evenly mixed together. In the tire, the tire tread chimney component provides a dissipative pathway for static electricity from the tire to a ground surface in operation.

In an exemplary embodiment, a rubber composition for a tire chimney component exhibits high electrical conductivity relative to the other rubber components of the tire, and in particular to a tread cap rubber formulated or compounded to minimize tire rolling resistance. The essence of the compounding strategy is the use of carboxylated nitrile rubber (CNR) in the compound. A non-limiting example of a suitable CNR is NIPOL® NX775 polymer, a cold polymerized, butadiene-acrylonitrile-carboxylic acid terpolymer. The electrically conductive tread compound employs the CNR polymer in place of electrically conductive carbon black in order to provide a desired level of conductivity. More specifically, the compound formula has 0 phr to 60 phr of NIPOL® NX775 polymer, 30 phr to 60 phr of reinforcing carbon black, and no electrically conductive carbon black.

BRIEF DESCRIPTION OF THE DRAWINGS

The above, as well as other advantages of the present disclosure, will become readily apparent to those skilled in the art from the following detailed description, particularly when considered in the light of the drawings described hereafter.

DETAILED DESCRIPTION

The following detailed description and appended drawings describe and illustrate various embodiments of the composition. The description and drawings serve to enable one skilled in the art to make and use the composition and are not intended to limit the scope of the composition in any manner. In respect of the methods disclosed, the steps presented are exemplary in nature, and thus, the order of the steps is not necessary or critical unless otherwise disclosed.

As used herein, the terms "phr" or "PH R" are defined as designating parts by weight of a material or ingredient per 100 parts by weight of total rubber or elastomer in a rubber composition. The terms "rubber" and "elastomer" may be used interchangeably unless otherwise indicated. The terms "vulcanized" and "cured" may also be used interchangeably, as well as "unvulcanized" and "uncured," unless otherwise indicated.

Figure 1:
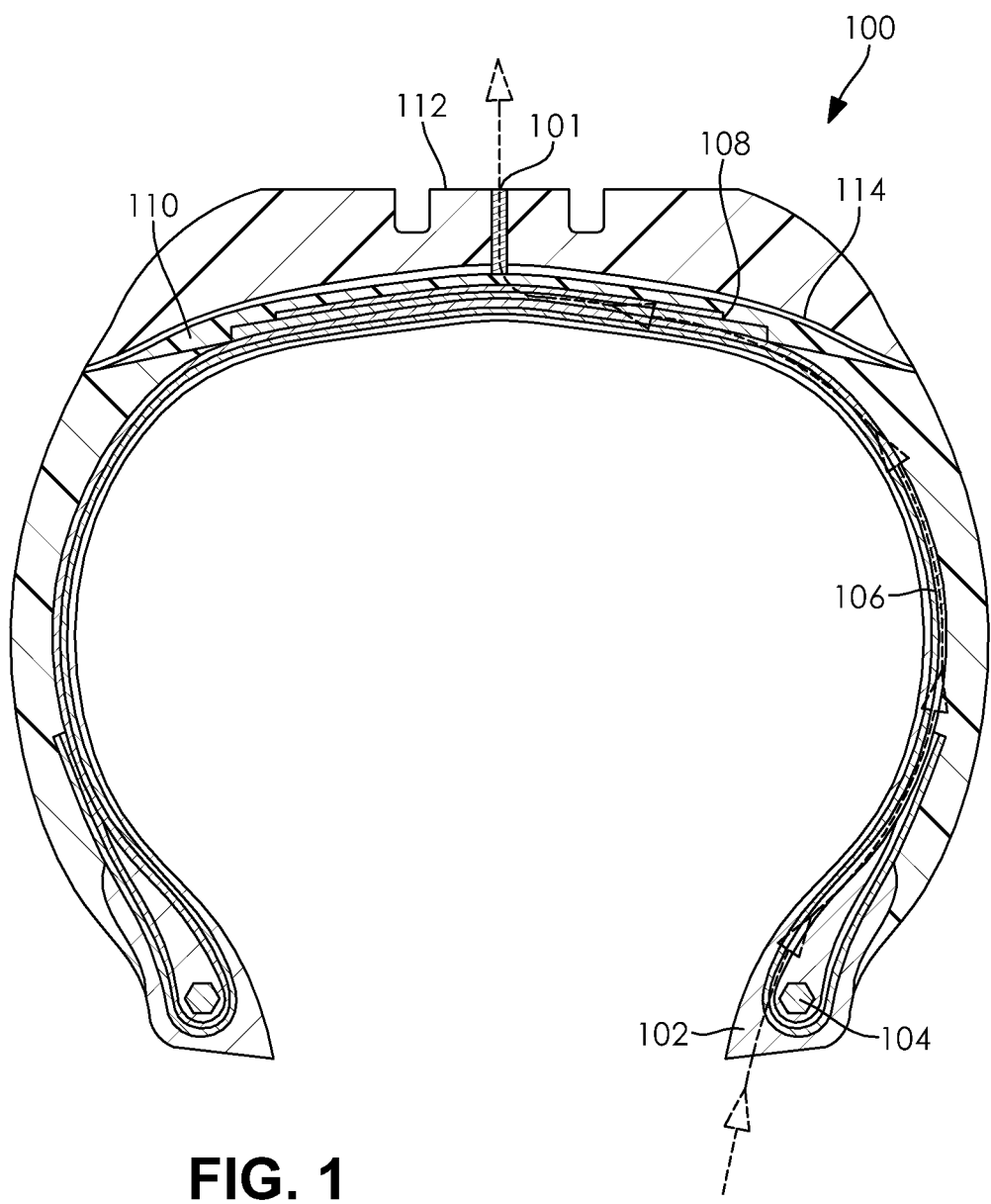
FIG. 1 is a cross-sectional side elevational view of a tire showing an exemplary position of a tire chimney component within the tire, the tire chimney component having a rubber composition according to one embodiment of the present disclosure.

The present disclosure includes a rubber composition for use in a chimney component 101 of a tire 100, for example, as shown in FIG. 1. It should be appreciated that static electricity may be generated by the vehicle and that current (shown by an arrow in FIG. 1) transfers to a rim cushion 102, a bead package 104, and a ply coat 106 from the tire rim (not shown). In particular, the static electricity current may pass from the rim cushion 102 to the ply coat 106, and then to the belt package 108 from the ply coat 106. From the belt package 108, the static electricity current may flow to an overwrap 110. The chimney component 101 is exposed at a crown of a tire tread cap 112 and extends through the tire tread cap 112 and a tread base 114 to the overwrap 110. Accordingly, the chimney component 101 allows for a flow or current of static electricity to travel from the tire tread to the ground.

Although the chimney component 101 is shown generally being a thin radial strip of rubber laterally centered along a width of the tire tread 112, 114, and in the crown area of the tire tread 112, 114, and likewise may be described herein as the "tread chimney component," one of ordinary skill may select other suitable dimensions, shapes, and locations for the chimney component 101 with the scope of the disclosure.

The rubber composition for the tread chimney component 101 has a quantity of a sulfur-vulcanizable elastomer and a quantity of an electrically conductive polymer. It should be appreciated that the electrically conductive polymer may also be sulfur-vulcanizable, but otherwise has an electrical conductivity that is significantly greater than the sulfur-vulcanizable elastomer forming the remainder of the total rubber or elastomer in the rubber composition.

Importantly, the rubber composition of the present disclosure is further defined by an absence of electrically conductive carbon black. As used herein, the term "electrically conductive carbon black" is defined to mean any carbon black that has an electrical conductivity that is greater than standard rubber reinforcing carbon black types classified under ASTM D1765 designations, for example, having an N prefix followed by a three-digit number. Non-limiting examples of suitable electrically conductive carbon black include acetylene carbon black and KETJEN-BLACK® carbon black, commercially available from Akzo Nobel Chemicals B.V. in Amersfoort, Netherlands.

The sulfur-vulcanizable elastomer employed in the rubber composition may be any suitable polymer selected to impart desired performance characteristics to the cured rubber composition. Such characteristics may include desired tread wear, dry and wet traction, hysteresis, toughness, and tear resistance properties. For example, the sulfur-vulcanizable elastomer may include, but is not limited to: natural rubber; polymers made from one or more conjugated dienes having from 4 to 12 carbon atoms, preferably from 4 to 6 carbon atoms such as butadiene, isoprene, etc.; styrene butadiene polymers made from a conjugated diene having from 4 to 12 carbon atoms with a vinyl substituted aromatic having from 8 to 12 carbon atoms such as styrene, alpha-methyl styrene, vinylpyridine, and the like; polymers and copolymers made from chloroprene; various halogen-containing polymers such as copolymers of vinylidene fluoride and hexafluoropropylene; acrylic rubbers including polymers and copolymers of alkyl acrylates; various nitrile rubbers; and combinations thereof. In a most particular embodiment, the elastomer may be in the form of natural rubber and high cis polybutadiene rubber. Natural rubber may provide a desirable level of tack and green strength in processing, and polybutadiene rubber may provide a desirable level of hysteresis and tread wear resistance, for example. One of ordinary skill in the art may a select other suitable elastomers and combinations thereof within the scope of the present disclosure, for example, based on an intended application or performance requirement.

The sulfur-vulcanizable elastomer of the rubber composition may be present in an amount between 0 phr and 70 phr, more particularly between 40 phr and 60 phr, and most particularly about 50 phr. Other suitable concentrations for the sulfur-vulcanizable elastomer in the rubber composition may also be selected, as desired.

It has been surprisingly found that certain polymers may have more electrical resistance than electrically conductive carbon black but can still achieve a desired electrical conductivity in the final cured compound without using electrically conductive carbon black. While it is believed that the necessary level of electrical resistance in the tread chimney component 101 is dependent upon the other materials and rubber compounds in the tire 100, known compounds utilizing conductive carbon blacks have been found to reduce compound electrical resistance to less than 150 Ω-cm under the ASTM D991 standard test method, the entire disclosure of which is hereby incorporated herein by reference.

Through testing, it has been found that the rubber composition of the present disclosure must have an electrical resistance lower than about 500 Ω-cm in order to be effective in the tread chimney component 101. In particular, it should be appreciated that the electrically conductive polymer employed in the rubber composition of the present disclosure is configured to provide an electrical resistivity in the cured rubber composition of less than 130 Ω-cm under the ASTM D991 standard test method, more particularly less than 120 Ω-cm, and most particularly less than 110 Ω-cm.

As one non-limiting example, the electrically conductive polymer will have electrical properties that fall below the static dissipative range of $1.0 \times 10^9 \Omega$. Furthermore, the electrically conductive polymer in the rubber composition may include at least one of carboxylated nitrile rubber (CNR) and epichlorohydrin elastomer (ECO). A non-limiting example of a suitable CNR is NIPOL® NX775 polymer, a cold polymerized, butadiene-acrylonitrile-carboxylic acid terpolymer. The NIPOL® NX775 polymer is a carboxylated nitrile butadiene having a carboxyl content between 0.067 ephr and 0.099 ephr and a bound acrylonitrile (ACN) content of between 25 percent and 28.5 percent.

Another non-limiting example of a suitable ECO is HYDRIN® T3108 polymer. The HYDRIN® T3108 polymer is an ethylene oxide/epichlorohydrin/allyl glycidyl ether terpolymer having a chlorine content between 18.1 and 20.1 percent.

Each of the NIPOL® NX775 polymer and the HYDRIN® T3108 polymer is commercially available from Zeon Chemical L.P. located in Tokyo, Japan. However, a skilled artisan may also select other suitable electrically conductive polymers, and combinations thereof, within the scope of the present disclosure.

The electrically conductive polymer may be present in the rubber composition in an amount between 0 phr and 70 phr, more particularly between 40 phr and 60 phr, and most particularly about 50 phr. Other suitable concentrations for the electrically conductive polymer in the rubber composition may also be selected, as desired.

Although the rubber composition of the present disclosure does not contain electrically conductive carbon black, it should be appreciated that other grades of conventional reinforcing carbon black may be used. While all carbon blacks are inherently conductive to at least a certain degree, the conventional reinforcing carbon blacks are expressly excluded from the definition of "electrically conductive carbon black" provided herein. Suitable classified grades of reinforcing carbon black may include N234, N330, N550, and N660, as non-limiting examples. These reinforcing carbon blacks are not considered to be sufficiently "electrically conductive." Further, these reinforcing carbon blacks are commonly found in bulk form in most tire manufacturing facilities, and may therefore be used in the rubber composition disclosed herein.

In a most particular embodiment, it has been found that use of N234 carbon black may provide both sufficient reinforcement and tread wear where the rubber composition is used as the chimney component 101 of the tire tread. The N234 carbon black also provides for similar color to surrounding typical tread compounds, which are likewise compounded with high surface area carbon blacks. Although the N234 carbon black may be particularly effective, other suitable reinforcing carbon black types may also be employed within the scope of the disclosure.

The reinforcing carbon black may be present in the rubber composition in an amount between 0 phr and 90 phr, more particularly between 50 phr and 70 phr, and most particularly about 60 phr. Other suitable concentrations for the reinforcing carbon black in the rubber composition may also be selected, as desired.

In order to facilitate the electrical conductivity of the rubber composition, the rubber composition may further include a polar plasticizer such as vegetable oil, as a non-limiting example. The vegetable oil is configured to enhance the electrical conductivity of the rubber composition as a whole. Without being bound to a particular theory, it is believed that the vegetable oil may bridge gaps within the electrically conductive polymer and the carbon black structure of the final compounded and vulcanized rubber composition, and thereby enhance the electrical conductivity. As a non-limiting example, a suitable vegetable oil may include a high oleic soybean oil. The vegetable oil may be present in an amount between 0 phr and 30 phr, more particularly between about 10 phr and 20 phr, and most particularly about 15 phr, for example. Other suitable types of vegetable oils and concentrations for the vegetable oil in the rubber formulation may also be employed by a skilled artisan within the scope of the disclosure.

The rubber composition of the instant disclosure can be compounded by various methods known in the rubber compounding art, such as by mixing the sulfur-vulcanizable elastomer and the electrically conductive polymer with various commonly used additive materials. For example, the additive materials may include curing aids such as sulfur, activators, retarders and accelerators, processing additives such as oils, resins, for example, tackifying resins, plasticizers, non-carbon fillers, pigments, fatty acids, zinc oxide, waxes, antioxidants and antiozonants, peptizing agents, and reinforcing materials such as the reinforcing carbon blacks described hereinabove, and the like. It should be appreciated that silica may not be used in the rubber composition of the present disclosure due to the undesirable effect this material may have on the electrical conductivity of the rubber composition. However, other suitable additives for rubber compositions may also be used, as desired. Depending on the intended use of the rubber composition, the common additives are selected and used in conventional amounts in the present rubber composition.

The sulfur-vulcanizable elastomer, the electrically conductive polymer, the reinforcing carbon black, and the additive materials are substantially evenly distributed throughout the rubber composition, for example, by a conventional mixing operation prior to an extrusion or molding operation. It should be understood that the substantially even distribution of the sulfur-vulcanizable elastomer and the electrically conductive polymer may be facilitated by a thorough mixing operation, and that the ability to perform such mixing operations is possessed by of one of ordinary skill in the art.

The present disclosure also includes an article comprising the rubber composition. It should be appreciated that the rubber composition may be extruded, molded, or otherwise formed into a desired shape and cured through the application of at least one of heat and pressure. In a most particular example, as also described hereinabove, the rubber composition may be used in the tread chimney component 101 in the tire tread.

As established hereinabove, although the chimney component 101 is shown as a single component in the area of the center-line of the tire tread 112, 114 in FIG. 1, it should be understood that the chimney component 101 may be located in other ground engaging areas of the tread and that more than one chimney component 101 may be provided. Furthermore, it should be understood that the rubber composition may be employed in at least a portion of a sidewall component or other tire component wherein the rubber composition provides an electrically conductive path to an exterior surface of the tire 100. The ability to locate the area for the chimney, to select the number of chimney components 101, and to employ the rubber composition in other tire components is possessed by of one of ordinary skill in the art.

The following examples are presented for the purposes of illustrating and not limiting the present invention.

Experimental

The rubber compositions of the present disclosure were prepared for testing according to conventional two-pass rubber mixing techniques in a laboratory-sized rubber mixer. The rubber compositions were selected to assess the general impact of the materials on the physiochemical properties of the rubber compositions. The formulas for these experimental rubber compositions (B-D), together with comparative controls both without electrically conductive carbon black (Control) and with electrically conductive carbon black (A), are shown below in TABLE 1.

TABLE 1

| Description | Control | A | B | C | D |
| --- | --- | --- | --- | --- | --- |
| Natural Rubber | 60.00 | 60.00 | 30.00 | 50.00 | 0.00 |
| Polybutadiene | 40.00 | 40.00 | 40.00 | 0.00 | 0.00 |

TABLE 1-continued

| Description | Control | A | B | C | D |
|---|---|---|---|---|---|
| ZEON NIPOL NX775 | 0.00 | 0.00 | 30.00 | 50.00 | 0.00 |
| ZEON HYDRIN T3108 | 0.00 | 0.00 | 0.00 | 0.00 | 100.00 |
| N650 Carbon Black | 60.00 | 60.00 | 60.00 | 60.00 | 60.00 |
| Acetylene Carbon Black | 0.00 | 20.00 | 0.00 | 0.00 | 0.00 |
| Antidegradant Package | 2.30 | 2.30 | 2.30 | 2.30 | 2.30 |
| Plasticizer Package | 2.50 | 17.50 | 17.50 | 17.50 | 17.50 |
| Cure Package | 7.90 | 7.90 | 6.90 | 6.90 | 6.90 |
| Total PHR: | 172.70 | 207.40 | 186.70 | 186.70 | 186.70 |
| Specific Gravity: | 1.136 | 1.159 | 1.131 | 1.146 | 1.397 |

In this series, the Control compound contained neither electrically conductive carbon black nor electrically conductive elastomer. The Compound A contained electrically conductive carbon black (acetylene black in this case) and therefore was used to approximate known tread chimney compounds. The Compound B contained no electrically conductive carbon black, but instead included electrically conductive elastomer (NIPOL® NX775) in partial replacement of natural rubber. The Compound C also contained the electrically conductive elastomer (NIPOL® NX775), but in a greater concentration, and again in the absence of electrically conductive carbon black. The Compound D contained no electrically conductive carbon black, but instead included another electrically conductive elastomer (HYDRIN® T3108).

The rubber compositions shown in TABLE 1 were cured using standard vulcanization techniques and tested for various processing and physiochemical properties. Select test results are shown below in TABLE 2.

TABLE 2

| Compound ID | Control | A | B | C | D |
|---|---|---|---|---|---|
| Chimney Conductivity (ASTM-D991) | | | | | |
| Volume Resistivity (Ω-cm) | 3.28E+03 | 1.30E+02 | 5.68E+03 | 4.14E+02 | 5.18E+01 |
| Stress/Strain 340 F × 15 m Original (Normalized) | | | | | |
| Hardness (Shore A) | 100 | 110 | 115 | 123 | 121 |
| M100 (psi) | 100 | 103 | 101 | 154 | 152 |
| M200 (psi) | 100 | 99 | 72 | 94 | 99 |
| M300 (psi) | 100 | 95 | 66 | 0 | 73 |
| Tensile (psi) | 100 | 94 | 61 | 55 | 62 |
| Peak Elongation (%) | 100 | 100 | 89 | 58 | 76 |
| Zwick Din (Avg. Vol Loss) (Normalized) | | | | | |
| Avg. Vol Loss | 100 | 107 | 114 | 179 | 171 |

Based on the test results in TABLE 2, it was observed that the Compound C, which had both electrically conductive elastomer and an absence of electrically conductive carbon black, had similar electrical conductivity and cured physical properties compared to Compound A, which was used to approximate conventional tread chimney compounds with electrically conductive carbon black. The Compound D was also observed to have superior electrical conductivity and similar cured physical properties compared to Compound A.

Exemplary chimney formulations were also prepared for testing according to conventional rubber mixing techniques in a laboratory-sized rubber mixer. The rubber compositions were based on existing tire tread chimney compounds and were prepared for comparison purposes to assess the specific impact of the materials on the physiochemical properties of the rubber compositions intended to be used in the chimney component of the tire. These rubber compositions (I-IV) are shown below in TABLE 3.

TABLE 3

| Description | I | II | III | IV |
|---|---|---|---|---|
| NATURAL RUBBER | 10.00 | 10.00 | 10.00 | 30.00 |
| POLYBUTADIENE | 30.00 | 35.00 | 35.00 | 40.00 |
| ZEON NIPOL NX775 | 60.00 | 55.00 | 55.00 | 30.00 |
| N234 CARBON BLACK | 48.00 | 48.00 | 48.00 | 48.00 |
| RAE OIL | 15.00 | 15.00 | 0.00 | 0.00 |
| Vegetable Oil | 0.00 | 0.00 | 15.00 | 15.00 |
| Total PHR*: | 163.00 | 163.00 | 163.00 | 163.00 |

*Antioxidants, Antiozonants, and Cure Package have been omitted from this table, but were otherwise present in conventional amounts.

In this series, each of the Compounds I through IV contained the electrically conductive elastomer, but otherwise had no electrically conductive carbon black. The Compounds I and II were prepared with differences in the amount of polybutadiene added, with the Compound II having 5 phr more polybutadiene than the Compound I for the purpose of further enhancing tread wear properties. The Compounds III and IV were prepared with differences in the amount of polybutadiene with the Compound IV having 5 phr more polybutadiene than the Compound III for the purpose of further enhancing tread wear properties. The Compounds III and IV were prepared with vegetable oil for the purpose of further enhancing tread wear and conductivity properties.

The rubber compositions shown in TABLE 3 were cured using standard vulcanization techniques and tested for various processing and physiochemical properties. More specifically, each of the Compounds I through IV was shown to have a volume resistivity of less than 130 Ω-cm under the ASTM D991 standard test method, regardless of the concentration of polybutadiene and electrically conductive elastomer.

Figure 2:
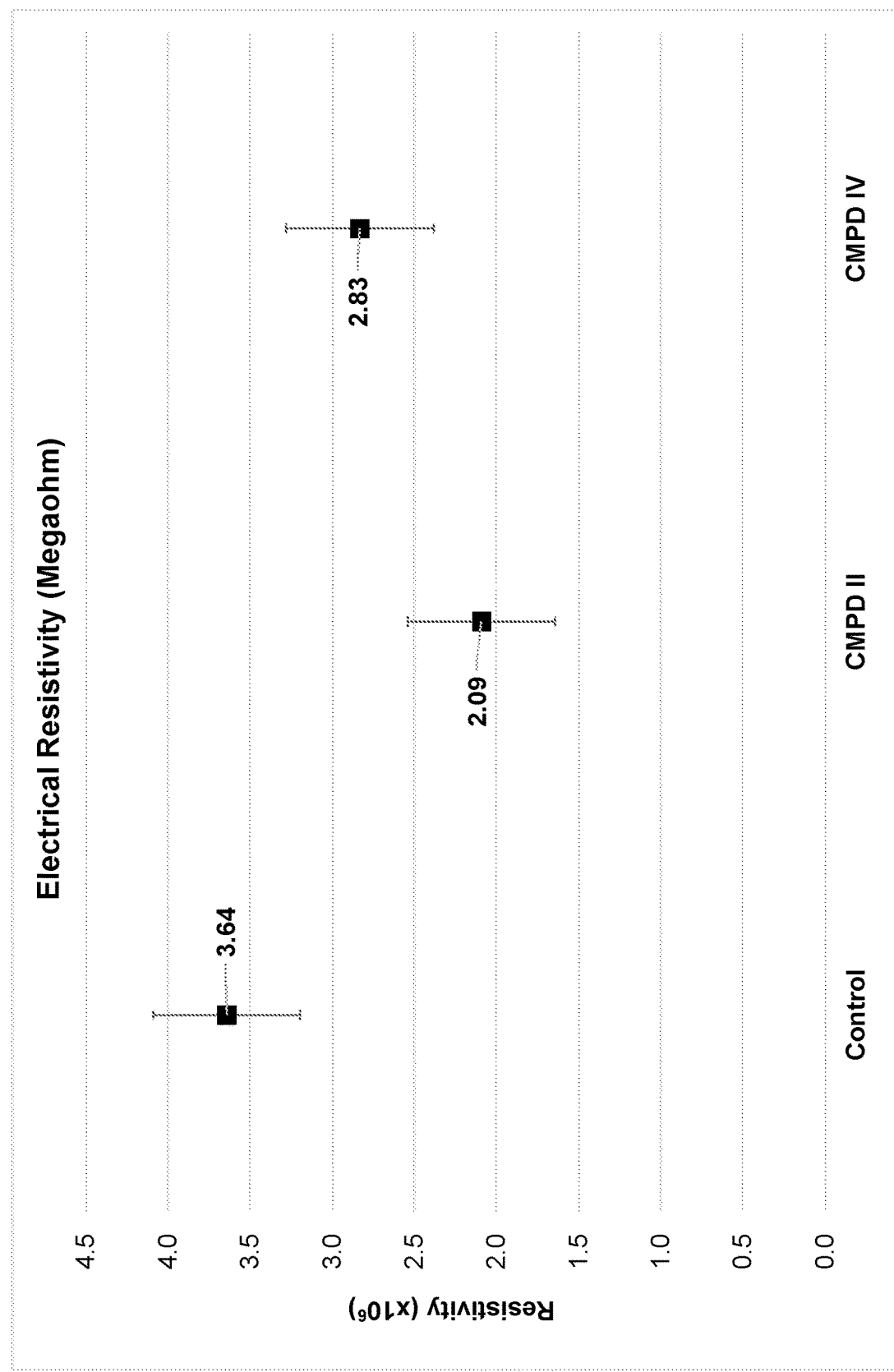
FIG. 2 is a chart showing compound resistance test results associated with an experimental test of various rubber compositions prepared according to various embodiments of the present disclosure.

Compounds II and IV, shown in TABLE 3, were tested under the ASTM F1971 standard test method, the entire disclosure of which is hereby incorporated herein by reference. The results are shown below in TABLE 4. The results are also depicted graphically in FIG. 2.

TABLE 4

| Chimney Resistivity (ASTM F1971)(Average) | | | |
|---|---|---|---|
| Compound ID | Control | II | IV |
| Electrical Resistivity (MΩ) | 3.64 | 2.09 | 2.83 |

As shown in TABLE 4, Compounds II and IV are shown to have an electrical resistivity that is lower than $1.0 \times 10E8\Omega$ under testing defined by ASTM F1971. This is believed to provide a sufficient pathway for electrical discharge to ground in comparison to known chimney tread compounds containing electrically conductive carbon black.

Advantageously, the tread chimney compositions of the present disclosure have been found to have electrical conductivity sufficient to provide a dissipative pathway for static electricity and grounding in tire operation, all while being formulated without the use of high-conductivity carbon black. The tread chimney compositions of the present disclosure further avoid the cost, manufacturing, handling, and processing problems associated traditional use of high-conductivity carbon black.

While certain representative embodiments and details have been shown for purposes of illustrating the invention, it will be apparent to those skilled in the art that various changes may be made without departing from the scope of the disclosure, which is further described in the following appended claims.

What is claimed is:

1. A rubber composition for a tire component, comprising:
   less than 70 phr of a sulfur-vulcanizable elastomer selected from the group consisting of natural rubber, polybutadiene, polyisoprene, styrene butadiene rubber, nitrile rubber, and combinations thereof; and
   greater than 15 phr of an electrically conductive polymer, the sulfur-vulcanizable elastomer and the electrically conductive polymer being substantially evenly mixed together, wherein the electrically conductive polymer is one of a carboxylated nitrile rubber and an epichlorohydrin elastomer;
   from about 1 to about 90 phr of a not sufficiently conductive reinforcing carbon black; and
   excluding electrically conductive carbon black.

2. The rubber composition of claim 1, wherein the electrically conductive polymer is a carboxylated nitrile rubber.

3. The rubber composition of claim 2, wherein the carboxylated nitrile rubber is a butadiene-acrylonitrile-carboxylic acid terpolymer.

4. The rubber composition of claim 2, wherein the carboxylated nitrile rubber has a bound acrylonitrile content between 25 percent and 28.5 percent.

5. The rubber composition of claim 1, wherein the rubber composition, upon curing, has volume resistivity of less than 130 Ω-cm under an ASTM D991 standard test method.

6. The rubber composition of claim 5, wherein the rubber composition, upon curing, has volume resistivity of less than 110 Ω-cm under the ASTM D991 standard test method.

7. The rubber composition of claim 1, wherein the electrically conductive polymer is present up to about 70 phr.

8. The rubber composition of claim 1, wherein the electrically conductive polymer is present in an amount between 40 phr and 60 phr.

9. The rubber composition of claim 1, further comprising vegetable oil.

10. The rubber composition of claim 9, wherein the vegetable oil is present in an amount between 1 phr and 30 phr.

11. The rubber composition of claim 9, wherein the vegetable oil is a soybean oil present in an amount between 11 phr and 20 phr.

12. A tire tread chimney component prepared with the rubber composition of claim 1.

13. A tire having an electrically conductive path from an interior of the tire to an outer surface of the tire, at least a portion of the electrically conductive path including the rubber composition of claim 1.

14. The tire of claim 13, wherein the electrically conductive path extends from a crown of a tire tread, and extends through the tire tread to a belt coat component.

15. The tire of claim 13, wherein the tire has an electrical resistivity that is lower than $1.0 \times 10E8\Omega$ under an ASTM F1971 standard test method.

* * * * *